US010619039B2

(12) United States Patent
Fukuda et al.

(10) Patent No.: US 10,619,039 B2
(45) Date of Patent: Apr. 14, 2020

(54) POLYPROPYLENE RESIN COMPOSITION AND USE THEREOF

(71) Applicants: Prime Polymer Co., Ltd., Minato-ku, Tokyo (JP); Honda Motor Co., Ltd., Minato-ku, Tokyo (JP)

(72) Inventors: Yusuke Fukuda, Ichihara (JP); Kenichi Hayakawa, Tipp City, OH (US); Yoshinobu Hatano, Wako (JP)

(73) Assignees: PRIME POLYMER CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 14/428,572

(22) PCT Filed: Sep. 17, 2013

(86) PCT No.: PCT/JP2013/075030
§ 371 (c)(1),
(2) Date: Mar. 16, 2015

(87) PCT Pub. No.: WO2014/046086
PCT Pub. Date: Mar. 27, 2014

(65) Prior Publication Data
US 2015/0274948 A1    Oct. 1, 2015

(30) Foreign Application Priority Data

Sep. 18, 2012   (JP) .................................. 2012-204602

(51) Int. Cl.
*C08L 23/12*    (2006.01)
*B62D 25/04*    (2006.01)
(Continued)

(52) U.S. Cl.
CPC .............. *C08L 23/12* (2013.01); *B62D 25/04* (2013.01); *B62D 29/043* (2013.01); *C08K 3/22* (2013.01);
(Continued)

(58) Field of Classification Search
None
See application file for complete search history.

(56) References Cited

U.S. PATENT DOCUMENTS 4,734,448 A * 3/1988 Kasahara ............. C08F 210/16
                                               524/310
5,539,067 A    7/1996 Parodi et al.
(Continued)

FOREIGN PATENT DOCUMENTS

CN        1580115 A     2/2005
CN      101809076 A     8/2010
(Continued)

OTHER PUBLICATIONS

Machine Translation of JP 2002-212353. Jul. 31, 2002.*
(Continued)

*Primary Examiner* — Alicia Chevalier
*Assistant Examiner* — Thomas A Mangohig
(74) *Attorney, Agent, or Firm* — Foley & Lardner LLP (57) ABSTRACT

A polypropylene resin composition including 100 parts by weight of basic components including a polypropylene resin (A) with a propylene polymer, the propylene polymer having a MFR of 10 to 300 g/10 min and containing 98 mol % or more of structural units derived from propylene, an ethylene.α-olefin copolymer (B) having an ethylene content of 65 to 90 mol %, and optionally an inorganic filler (E); 0.2 to 1 part by weight of a fatty acid amide (C); and 0.2 to 1 part by weight of a surfactant (D).

6 Claims, 1 Drawing Sheet

TEST RESULTS

<EX. 3>    <COMP. EX. 1>

(51) Int. Cl.

| | | |
|---|---|---|
| *B62D 29/04* | (2006.01) | |
| *C08L 23/08* | (2006.01) | |
| *C08L 23/14* | (2006.01) | |
| *C08K 3/22* | (2006.01) | |
| *C09K 3/16* | (2006.01) | |
| *B29C 45/00* | (2006.01) | |
| *C08K 3/16* | (2006.01) | |
| *C08K 5/10* | (2006.01) | |
| *C08K 5/20* | (2006.01) | |
| *B29K 23/00* | (2006.01) | |
| *B29K 105/00* | (2006.01) | |
| *B29L 31/30* | (2006.01) | |

(52) U.S. Cl.
CPC ........... *C08L 23/08* (2013.01); *C08L 23/0815* (2013.01); *C08L 23/142* (2013.01); *C09K 3/16* (2013.01); *B29C 45/0001* (2013.01); *B29K 2023/04* (2013.01); *B29K 2023/12* (2013.01); *B29K 2105/0085* (2013.01); *B29L 2031/3041* (2013.01); *C08K 5/10* (2013.01); *C08K 5/20* (2013.01); *C08L 2205/03* (2013.01)

(56) References Cited

U.S. PATENT DOCUMENTS

| | | | |
|---|---|---|---|
| 5,618,771 | A | 4/1997 | Parodi et al. |
| 5,780,378 | A | 7/1998 | Toida et al. |
| 5,877,265 | A | 3/1999 | Toida et al. |
| 6,194,342 | B1 | 2/2001 | Parodi et al. |
| 6,515,085 | B1 | 2/2003 | Parodi et al. |
| 6,777,508 | B1 | 8/2004 | Parodi et al. |
| 2004/0044107 | A1 | 3/2004 | Kikuchi et al. |
| 2004/0116607 | A1* | 6/2004 | Malm .............. C08F 10/06 525/240 |
| 2004/0161599 | A1* | 8/2004 | Nishizawa ......... B29C 71/0081 428/327 |
| 2005/0154101 | A1 | 7/2005 | McEnhill et al. |
| 2005/0202958 | A1 | 9/2005 | Yoshikiyo et al. |
| 2008/0033104 | A1 | 2/2008 | Grein et al. |
| 2008/0220193 | A1 | 9/2008 | Tohi et al. |
| 2010/0210780 | A1 | 8/2010 | Sugimoto |
| 2012/0225994 | A1* | 9/2012 | Kondo .............. C08L 23/10 524/528 |

FOREIGN PATENT DOCUMENTS

| | | |
|---|---|---|
| EP | 0 585 869 A1 | 3/1994 |
| JP | S57-063310 A | 4/1982 |
| JP | H 05-170843 A | 7/1993 |
| JP | 2001-261902 A | 9/2001 |
| JP | 2001-354714 A | 12/2001 |
| JP | 2002-060560 A | 2/2002 |
| JP | 2002-212353 A | 7/2002 |
| JP | 2003-171472 A | 6/2003 |
| JP | 2004-051769 A | 2/2004 |
| JP | 2007-526345 A | 9/2007 |
| JP | 2009-079117 A | 4/2009 |
| JP | 2012-132024 A | 7/2012 |
| WO | WO-2004/016662 A1 | 2/2004 |

OTHER PUBLICATIONS

Diethanolamine palmitic acid amide. http://www.chemexper.com/search/cas/7545246.html. Accessed Feb. 13, 2017.*

Glycerol Stearate. http://www.chemspider.com/Chemical-Structure.71407.html. Accessed Feb. 13, 2017.*

Office Action issued in Chinese Patent Application No. 201380048044.5 dated Feb. 15, 2016.

International Search Report dated Dec. 17, 2013 issued in Application No. PCT/JP2013/075030.

Brazilian Preliminary Office Action dated Dec. 3, 2019 for corresponding Application No. 1120150059074.

* cited by examiner

TEST RESULTS

<EX. 3>   <COMP. EX. 1>

POLYPROPYLENE RESIN COMPOSITION AND USE THEREOF

CROSS REFERENCE TO RELATED APPLICATIONS

This application is the National Phase of PCT/JP2013/075030, filed Sep. 17, 2013, which claims priority to Japanese Application No. 2012-204602, filed Sep. 18, 2012.

TECHNICAL FIELD

The present invention relates to polypropylene resin compositions and uses thereof. In particular, the invention relates to polypropylene resin compositions suited for use in the production of automobile interior and exterior parts such as pillar trims, door trims and door panels, and to shaped articles of the compositions.

BACKGROUND ART

Because of being lightweight and having excellent shaping properties, various resins have been used as raw materials for automobile interior and exterior parts such as pillars, door trims and door panels. For example, automobile interior parts such as instrument panels, door trims and door panels have been produced using leather-like finished materials such as acrylonitrile-styrene resins (AS resins) and polypropylene resins (PP resins) coated with soft resin skins such as vinyl chloride, or AS resins and PP resins grained and painted to attain a leather-like texture.

With a recent increase in the demands for the simplification of production steps and the recycling of surplus materials, there is an increasing demand that shaped resin articles which have undergone surface processing such as graining be used as automobile interior and exterior parts without being finished by painting, the application of films or the like. However, uncoated resin articles such as polypropylene resin shaped articles have a problem in that they are prone to be scratched during assembling or use.

Thus, various studies have been made on resin compositions which can give shaped articles having excellent properties required for automobile interior and exterior parts such as shaping properties, rigidity and heat resistance and also exhibiting excellent scratch resistance. For example, fillers are added to increase strength (see Patent Literature 1), resin components with excellent crystallinity are used to enhance hardness (see Patent Literature 2), and talc and scratch improvers are added to polypropylene compositions to obtain high Izod impact strength and high scratch whitening load (see Patent Literature 3). According to these techniques, the resistance to scratching may be enhanced to a certain degree.

However, the problem of the deterioration in surface conditions that is encountered during the actual use of shaped articles as automobile interior and exterior materials is not limited to flaws such as scratches but is also caused when the articles are rubbed with soft substances such as rubbers, for example, when the articles are kicked with shoe soles.

CITATION LIST

Patent Literature

Patent Literature 1: JP-A-2009-79117
Patent Literature 2: JP-A-2012-132024
Patent Literature 3: JP-A-2002-60560

SUMMARY OF INVENTION

Technical Problem

Under these circumstances, the present inventors carried out extensive studies and have found that the rubbing of shaped articles with soft substances such as rubbers, for example, the kicking with shoe soles, produces very shallow scrapes in the surface, flattens the grain or results in the remaining of the soft substances that have rubbed the surface, and these results of the rubbing cause deteriorations in surface properties such as surface whitening. The present invention is aimed at solving these problems. It is therefore an object of the invention to provide polypropylene resin compositions which can give shaped articles that are less prone to suffer deterioration in surface conditions due to friction with soft substances such as rubbers, have excellent whitening resistance and are suited as automobile interior and exterior parts, and to provide shaped articles of the compositions.

Solution to Problem

A polypropylene resin composition of the present invention includes:
100 parts by weight of basic components including:
(A) a polypropylene resin including:
(a-1) 30 to 80 parts by weight of a propylene polymer having a melt flow rate measured in accordance with JIS K 7210 (MFR, 230° C., 21.16 N load) of 10 g/10 min to 300 g/10 min, and containing 98 mol % to 100 mol % of structural units derived from propylene and 0 mol % to 2 mol % of structural units derived from at least one α-olefin selected from ethylene and α-olefins having 4 to 8 carbon atoms, and
(a-2) 0 to 30 parts by weight of a propylene.ethylene copolymer having an intrinsic viscosity [η] measured at 135° C. in decalin of 1.5 dl/g to 8 dl/g and containing 30 mol % to 60 mol % of structural units derived from ethylene,
the total of (a-1) and (a-2) being 30 to 80 parts by weight,
(B) 20 to 50 parts by weight of an ethylene.α-olefin copolymer having an ethylene content of 65 mol % to 90 mol % and including ethylene and at least one α-olefin selected from α-olefins having 3 to 8 carbon atoms, and
(E) 0 to 40 parts by weight of an inorganic filler,
the total of (a-2) and (B) being 20 to 50 parts by weight (the total of (A), (B) and (E) is 100 parts by weight);
0.2 to 1 part by weight of a fatty acid amide (C); and
0.2 to 1 part by weight of a surfactant (D).

In the polypropylene resin composition of the invention, it is preferable that:
the fatty acid amide (C) be one or more selected from fatty acid amides having 8 to 25 carbon atoms and dimers thereof; and
the surfactant (D) be a compound having one or two ester groups of 8 to 25 carbon atoms.

A shaped article of the present invention includes the above inventive polypropylene resin composition.

The shaped article of the invention is preferably an injection molded article.

The shaped article of the invention is preferably an automobile interior or exterior part, and the automobile interior or exterior part is more preferably an automobile door part or pillar part.

Advantageous Effects of Invention

The polypropylene resin compositions of the invention have excellent shaping properties such as injection molding properties and can give shaped articles which exhibit excellent properties such as rigidity and impact resistance and which are effectively prevented from deteriorations in surface properties due to friction with soft substances such as rubbers (namely, have excellent kicking scuff resistance).

The shaped articles of the invention exhibit excellent properties such as rigidity and impact resistance and further have excellent surface lubricating properties to show a resistance to deteriorations in surface properties when rubbed with soft substances. Thus, the shaped articles are particularly suited for use in automobile interior and exterior parts.

DESCRIPTION OF EMBODIMENTS

The present invention will be described in detail hereinbelow.

<Polypropylene Resin Compositions>

The polypropylene resin composition of the invention includes basic components including a polypropylene resin (A), an ethylene.α-olefin copolymer (B) and optionally an inorganic filler (E), and further includes a fatty acid amide (C) and a surfactant (D).

Basic Components

The basic components forming the inventive polypropylene resin composition include a polypropylene resin (A), an ethylene.α-olefin copolymer (B) and optionally an inorganic filler (E).

Polypropylene Resins (A)

The polypropylene resin (A) includes a propylene polymer (a-1) as an essential component, and optionally includes a propylene.ethylene copolymer (a-2) as required.

Propylene Polymers (a-1)

The propylene polymer (a-1) in the invention is a propylene homopolymer or a copolymer of propylene with a small amount of an α-olefin. Here, the α-olefin is at least one α-olefin selected from ethylene and α-olefins having 4 to 8 carbon atoms, and is preferably ethylene.

When the propylene polymer (a-1) is a copolymer of propylene with a small amount of an α-olefin, the content of structural units derived from propylene is not less than 98 mol % and the content of structural units derived from the α-olefin is not more than 2 mol %.

The propylene polymer (a-1) usually has a melt flow rate measured in accordance with JIS K 7210 (MFR, 230° C., 21.16 N load) of 10 g/10 min to 300 g/10 min. The lower limit of the melt flow rate is preferably 30 g/10 min, and more preferably 50 g/10 min. The upper limit is preferably 270 g/10 min, and more preferably 250 g/10 min.

The propylene polymers (a-1) are not particularly limited, and may be obtained by homopolymerizing propylene or copolymerizing propylene with a small amount of an α-olefin as required in the presence of a known olefin polymerization catalyst. Examples of the olefin polymerization catalysts include titanium catalysts and metallocene catalysts, with titanium catalysts being more preferable. Any propylene polymers (a-1) having a content of the propylene-derived structural units of not less than 98 mol % and a melt flow rate of 10 g/10 min to 300 g/10 min may be used. Commercial products having the corresponding parameters may be appropriately used.

Propylene.Ethylene Copolymers (a-2)

The polypropylene resin (A) may include a propylene-.ethylene copolymer (a-2) as required in addition to the propylene polymer (a-1).

The propylene.ethylene copolymer (a-2) is a copolymer of propylene and ethylene usually having a content of the ethylene-derived structural units of 30 mol % to 60 mol %, preferably 30 mol % to 55 mol %, and more preferably 30 mol % to 50 mol %.

The propylene.ethylene copolymer (a-2) which may be used in the invention has an intrinsic viscosity [η] measured at 135° C. in decalin of 1.5 dl/g to 8 dl/g. The lower limit of the intrinsic viscosity of the propylene.ethylene copolymer (a-2) is preferably 1.6 dl/g, and more preferably 1.8 dl/g. The upper limit is preferably 7.5 dl/g, and more preferably 7.0 dl/g.

The propylene.ethylene copolymers (a-2) are not particularly limited, and may be obtained by copolymerizing propylene and ethylene in the presence of a known olefin polymerization catalyst. Examples of the olefin polymerization catalysts include titanium catalysts and metallocene catalysts, with titanium catalysts being more preferable.

As long as the above properties are satisfied, the propylene.ethylene copolymer (a-2) may be present as a propylene.ethylene copolymer segment in a block copolymer or may form a random copolymer. Preferably, the copolymer is present as a propylene.ethylene copolymer segment in a block copolymer produced by steps including two or more polymerization stages.

Polypropylene Resins (A)

The polypropylene resin (A) in the invention includes the propylene polymer (a-1) as an essential component, and optionally includes the propylene.ethylene copolymer (a-2) as required.

That is, the polypropylene resin (A) in the invention may be preferably composed of the propylene polymer (a-1) alone or may be composed of the propylene polymer (a-1) and the propylene.ethylene copolymer (a-2). The components (a-1) and (a-2) may be added in any amounts as long as the amounts of (a-1) and (a-2) in the inventive polypropylene resin composition are 30 to 80 parts by weight and 0 to 30 parts by weight, respectively, and the total amount of (a-1) and (a-2), namely, the amount of (A) in the composition is 30 to 80 parts by weight. The components (a-1) and (a-2) may be preferably added in such amounts that the amounts of (a-1) and (a-2) are 30 to 75 parts by weight and 5 to 25 parts by weight, respectively, and the total amount of (a-1) and (a-2), namely, the amount of (A) is 35 to 80 parts by weight, and more preferably the amounts of (a-1) and (a-2) are 30 to 73 parts by weight and 7 to 25 parts by weight, respectively, and the total amount of (a-1) and (a-2), namely, the amount of (A) is 37 to 80 parts by weight.

When the polypropylene resin (A) in the invention includes the propylene polymer (a-1) and the propylene.ethylene copolymer (a-2), the polypropylene resin (A) may be a simple mixture of the propylene polymer (a-1) and the propylene.ethylene copolymer (a-2), or may be a block copolymer having a segment of the propylene polymer (a-1) and a segment of the propylene.ethylene copolymer (a-2). In particular, it is preferable that the polypropylene resin (A) be a block copolymer having a segment of the propylene polymer (a-1) and a segment of the propylene.ethylene copolymer (a-2).

Based on the knowledge of the present inventors, a fraction ($D_{insol}$) of a propylene.ethylene block copolymer that is insoluble in n-decane at room temperature is mainly composed of a propylene polymer component. That is, the propylene polymer (a-1) corresponds to such a fraction.

On the other hand, a fraction ($D_{sol}$) that is soluble in n-decane at room temperature is mainly composed of a propylene-ethylene copolymer rubber component. That is, the propylene.ethylene copolymer (a-2) corresponds to such a fraction.

Thus, when the polypropylene resin (A) in the invention is a block copolymer having a segment of the propylene polymer (a-1) and a segment of the propylene.ethylene copolymer (a-2), a fraction ($D_{insol}$) of the polypropylene resin (A) that is insoluble in n-decane at room temperature may be regarded as the propylene polymer (a-1) and a fraction ($D_{sol}$) that is soluble in n-decane at room temperature may be regarded as the propylene.ethylene copolymer (a-2), and the respective properties and the weight ratio of these fractions appropriately satisfy the aforementioned conditions.

Propylene.ethylene block copolymers are a preferred form of the polypropylene resins (A) used in the invention, and a method for producing such block copolymers will be described later.

Preparation of Polypropylene Resins (A)

As mentioned above, the propylene polymer (a-1) and the optional propylene.ethylene copolymer (a-2) that constitute the polypropylene resin (A) may be prepared by performing polymerization or copolymerization in the presence of a known olefin polymerization catalyst. Specifically, for example, the olefin polymerization catalyst may be a catalyst including a solid titanium catalyst component (I) and an organometallic compound catalyst component (II).

[Solid Titanium Catalyst Components (I)]

The solid titanium catalyst component (I) includes titanium, magnesium, halogen and optionally an electron donor. Any of known solid titanium catalyst components may be used as the solid titanium catalyst components (I) without limitation.

Some examples of the methods for producing the solid titanium catalyst components (I) are described below.

In many cases, the preparation of the solid titanium catalyst component (I) in the invention involves a magnesium compound and a titanium compound.

Examples of the magnesium compounds include known magnesium compounds, specifically, magnesium halides such as magnesium chloride and magnesium bromide; alkoxymagnesium halides such as methoxymagnesium chloride, ethoxymagnesium chloride and phenoxymagnesium chloride; alkoxymagnesiums such as ethoxymagnesium, isopropoxymagnesium, butoxymagnesium and 2-ethylhexoxymagnesium; aryloxymagnesiums such as phenoxymagnesium; and magnesium carboxylate salts such as magnesium stearate.

The magnesium compounds may be used singly, or two or more may be used in combination.

The above magnesium compounds may be in the form of complex compounds or composite compounds including other metals, or mixtures with other metal compounds.

Of these compounds, halogen-containing magnesium compounds are preferable, and magnesium halides, in particular, magnesium chloride may be preferably used. Further, alkoxymagnesiums such as ethoxymagnesium may be preferably used. The magnesium compounds may be derivatives from various substances, for example, derivatives obtained by contacting organomagnesium compounds such as Grignard reagents with halogenated compounds such as titanium halide, silicon halide and halogenated alcohols.

Examples of the titanium compounds include tetravalent titanium compounds represented by the following formula.

$$Ti(OR)_g X_{4-g}$$

(In the formula, R is a hydrocarbon group, X is a halogen atom, and g is 0≤g≤4.)

Specific examples include titanium tetrahalides such as $TiCl_4$ and $TiBr_4$; alkoxytitanium trihalides such as $Ti(OCH_3)Cl_3$, $Ti(OC_2H_5)Cl_3$, $Ti(O-n-C_4H_9)Cl_3$, $Ti(OC_2H_5)Br_3$ and $Ti(O-iso\ C_4H_9)Br_3$; alkoxytitanium dihalides such as $Ti(OCH_3)_2Cl_2$ and $Ti(OC_2H_5)_2Cl_2$; alkoxytitanium monohalides such as $Ti(OCH_3)_3Cl$, $Ti(O-n-C_4H_9)_3Cl$ and $Ti(OC_2H_5)_3Br$; and tetraalkoxy titaniums such as $Ti(OCH_3)_4$, $Ti(OC_2H_5)_4$, $Ti(OC_4H_9)_4$ and $Ti(O-2-ethylhexyl)_4$.

Of these, titanium tetrahalides are preferable, and titanium tetrachloride is particularly preferable. The titanium compounds may be used singly, or two or more may be used in combination.

Examples of the magnesium compounds and the titanium compounds further include those compounds described in literatures such as JP-A-S57-63310 and JP-A-H05-170843.

Specifically, preferred examples of the preparation of the solid titanium catalyst component (I) used in the production of the polypropylene resin (A) in the invention include the following methods (P-1) to (P-4).

(P-1) A solid adduct including a magnesium compound and an electron donor component (a) such as an alcohol is contacted with an electron donor component (b) described later and a liquid titanium compound in a suspension in an inert hydrocarbon solvent.

(P-2) A solid adduct including a magnesium compound and an electron donor component (a) is contacted with an electron donor component (b) and a liquid titanium compound at several times in several portions.

(P-3) A solid adduct including a magnesium compound and an electron donor component (a) is contacted with an electron donor component (b) and a liquid titanium compound in a suspension in an inert hydrocarbon solvent and contacts are conducted several times in several portions.

(P-4) A liquid magnesium compound including a magnesium compound and an electron donor component (a) is contacted with a liquid titanium compound and an electron donor component (b).

The reaction temperature is preferably in the range of −30° C. to 150° C., more preferably −25° C. to 130° C., and still more preferably −25 to 120° C.

The production of the solid titanium catalyst component may involve a known medium as required. Examples of the media include aromatic hydrocarbons having a slight polarity such as toluene, and known aliphatic hydrocarbon compounds and alicyclic hydrocarbon compounds such as heptane, octane, decane and cyclohexane. Of these, aliphatic hydrocarbons are preferable.

The electron donor component (a) used in the formation of the solid adduct or the liquid magnesium compound is preferably a known compound which can dissolve the aforementioned magnesium compound at a temperature in the range of from room temperature to approximately 300° C. Preferred examples of such compounds include alcohols, aldehydes, amines, carboxylic acids and mixtures thereof.

Examples of such compounds include those compounds described in literatures such as JP-A-S57-63310 and JP-A-H05-170843.

Specific examples of the alcohols capable of dissolving the magnesium compounds include aliphatic alcohols such as methanol, ethanol, propanol, butanol, isobutanol, ethylene glycol, 2-methylpentanol, 2-ethylbutanol, n-heptanol, n-octanol, 2-ethylhexanol, decanol and dodecanol; alicyclic alcohols such as cyclohexanol and methylcyclohexanol; aromatic alcohols such as benzyl alcohol and methylbenzyl alcohol; and alkoxy group-containing aliphatic alcohols such as n-butylcellosolve.

Examples of the carboxylic acids include organic carboxylic acids having 7 or more carbon atoms such as caprylic acid and 2-ethylhexanoic acid.

Examples of the aldehydes include aldehydes having 7 or more carbon atoms such as capric aldehyde and 2-ethylhexylaldehyde.

Examples of the amines include amines having 6 or more carbon atoms such as heptylamine, octylamine, nonylamine, laurylamine and 2-ethylhexylamine.

The above alcohols are preferable as the electron donor components (a), and such alcohols as ethanol, propanol, butanol, isobutanol, hexanol, 2-ethylhexanol and decanol are particularly preferable.

The compositional ratio between magnesium and the electron donor component (a) in the solid adduct or the liquid magnesium compound is not necessarily limited and may be variable depending on the types of the compounds used. It is, however, preferable that the amount of the electron donor component (a) be not less than 2 mol, more preferably not less than 2.3 mol, and still more preferably in the range of 2.7 mol to 5 mol per 1 mol of magnesium in the magnesium compound.

Particularly preferred examples of the electron donors used as appropriate in the solid titanium catalyst component (I) in the invention may include aromatic carboxylate esters and/or compounds having two or more ether bonds via a plurality of carbon atoms (hereinafter, such electron donors are also written as "electron donor components (b)").

The electron donor components (b) may be any of known aromatic carboxylate esters or polyether compounds suitably used in conventional olefin polymerization catalysts, for example, any of compounds described in literatures such as JP-A-H05-170843 and JP-A-2001-354714 without limitation.

Specific examples of the aromatic carboxylate esters include aromatic carboxylate monoesters such as benzoate esters and toluylate esters, and aromatic polyvalent carboxylate esters such as phthalate esters.

Of these, aromatic polyvalent carboxylate esters are preferable, and phthalate esters are more preferable.

Preferred examples of the phthalate esters include alkyl phthalate esters such as ethyl phthalate, n-butyl phthalate, isobutyl phthalate, hexyl phthalate and heptyl phthalate. Diisobutyl phthalate is particularly preferable.

Specific examples of the polyether compounds include compounds represented by the following formula (1).

[Chem. 1]

(1)

In the formula (1), m is an integer of $1 \leq m \leq 10$, and more preferably $3 \leq m \leq 10$, and $R^{11}$ to $R^{36}$ are each independently a hydrogen atom or a substituent having at least one element selected from carbon, hydrogen, oxygen, fluorine, chlorine, bromine, iodine, nitrogen, sulfur, phosphorus, boron and silicon.

When m is 2 or greater, $R^{11}$s and $R^{12}$s may be each the same or different from one another.

Any of $R^{11}$ to $R^{36}$, preferably $R^{11}$ and $R^{12}$, may be linked together to form a ring other than the benzene ring.

Some specific examples of such compounds include monosubstituted dialkoxypropanes such as 2-isopropyl-1,3-dimethoxypropane, 2-s-butyl-1,3-dimethoxypropane and 2-cumyl-1,3-dimethoxypropane; disubstituted dialkoxypropanes such as 2-isopropyl-2-isobutyl-1,3-dimethoxypropane, 2,2-dicyclohexyl-1,3-dimethoxypropane, 2-methyl-2-isopropyl-1,3-dimethoxypropane, 2-methyl-2-cyclohexyl-1,3-dimethoxypropane, 2-methyl-2-isobutyl-1,3-dimethoxypropane, 2,2-diisobutyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2,2-di-s-butyl-1,3-dimethoxypropane, 2,2-dineopentyl-1,3-dimethoxypropane, 2-isopropyl-2-isopentyl-1,3-dimethoxypropane and 2-cyclohexyl-2-cyclohexylmethyl-1,3-dimethoxypropane; dialkoxyalkanes such as 2,3-dicyclohexyl-1,4-diethoxybutane, 2,3-dicyclohexyl-1,4-diethoxybutane, 2,3-diisopropyl-1,4-diethoxybutane, 2,4-diphenyl-1,5-dimethoxypentane, 2,5-diphenyl-1,5-dimethoxyhexane, 2,4-diisopropyl-1,5-dimethoxypentane, 2,4-diisobutyl-1,5-dimethoxypentane and 2,4-diisoamyl-1,5-dimethoxypentane; and trialkoxyalkanes such as 2-methyl-2-methoxymethyl-1,3-dimethoxypropane, 2-cyclohexyl-2-ethoxymethyl-1,3-diethoxypropane and 2-cyclohexyl-2-methoxymethyl-1,3-dimethoxypropane.

Of these, 1,3-diethers are preferable, and 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl) 1,3-dimethoxypropane are particularly preferable.

These compounds may be used singly, or two or more may be used in combination.

In the solid titanium catalyst component (I) used in the invention, the halogen/titanium ratio (atomic ratio) (namely, moles of the halogen atoms/moles of the titanium atoms) is desirably 2 to 100, and preferably 4 to 90. Regarding the electron donor component (a) and the electron donor component (b), the electron donor component (a)/titanium atom ratio (by mol) is desirably 0 to 100, and preferably 0 to 10, and the electron donor component (b)/titanium atom ratio (by mol) is desirably 0 to 100, and preferably 0 to 10.

The magnesium/titanium ratio (atomic ratio) (namely, moles of the magnesium atoms/moles of the titanium atoms) is desirably 2 to 100, and preferably 4 to 50.

More specifically, the solid titanium catalyst component (I) may be preferably prepared by adopting conditions described in literature such as EP585869A1 (EP Patent Application Publication 0585869) or JP-A-H05-170843, except the use of the electron donor component (b).

Next, there will be described the organometallic compound catalyst components (II) including metal elements selected from Group I, Group II and Group XIII of the periodic table.

[Organometallic Compound Catalyst Components (II)]

Examples of the organometallic compound catalyst components (II) include compounds containing Group XIII metals such as organoaluminum compounds, complex alkyl compounds containing Group I metals and aluminum, and organometallic compounds containing Group II metals.

Of these, organoaluminum compounds are preferable.

Specifically, preferred examples of the organometallic compound catalyst components (II) include organometallic compound catalyst components described in known literatures such as EP585869A1.

A known electron donor component (c) may be used in combination with the electron donor component (a) and/or the electron donor component (b) without impairing the object of the invention.

Preferred examples of the electron donor components (c) include organosilicon compounds.

Examples of the organosilicon compounds include compounds represented by the following formula.

$R_nSi(OR')_{4-n}$ (In the formula, R and R' are hydrocarbon groups, and n is an integer of 0<n<4.)

Specific examples of the organosilicon compounds represented by the above formula include diisopropyldimethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane, vinyltrimethoxysilane, vinyltriethoxysilane, t-butyltriethoxysilane, phenyltriethoxysilane, cyclohexyltrimethoxysilane, cyclopentyltrimethoxysilane, 2-methylcyclopentyltrimethoxysilane, cyclopentyltriethoxysilane, dicyclopentyldimethoxysilane, dicyclopentyldiethoxysilane, tricyclopentylmethoxysilane, dicyclopentylmethylmethoxysilane, dicyclopentylethylmethoxysilane and cyclopentyldimethylethoxysilane.

Of these, vinyltriethoxysilane, diphenyldimethoxysilane, dicyclohexyldimethoxysilane, cyclohexylmethyldimethoxysilane and dicyclopentyldimethoxysilane are preferably used.

Preferred examples of the organosilicon compounds further include silane compounds of the following formula described in WO 2004/016662.

$Si(OR^a)_3(NR^bR^c)$

In the formula, $R^a$ is a hydrocarbon group having 1 to 6 carbon atoms. Examples of $R^a$ include unsaturated or saturated aliphatic hydrocarbon groups having 1 to 6 carbon atoms, with hydrocarbon groups having 2 to 6 carbon atoms being particularly preferable. Specific examples include methyl group, ethyl group, n-propyl group, iso-propyl group, n-butyl group, iso-butyl group, sec-butyl group, n-pentyl group, iso-pentyl group, cyclopentyl group, n-hexyl group and cyclohexyl group, with ethyl group being particularly preferable.

$R^b$ is a hydrocarbon group having 1 to 12 carbon atoms, or is a hydrogen atom. Examples of $R^b$ include hydrogen atom and unsaturated or saturated aliphatic hydrocarbon groups having 1 to 12 carbon atoms. Specific examples include hydrogen atom, methyl group, ethyl group, n-propyl group, iso-propyl group, n-butyl group, iso-butyl group, sec-butyl group, n-pentyl group, iso-pentyl group, cyclopentyl group, n-hexyl group, cyclohexyl group and octyl group, with ethyl group being particularly preferable.

$R^c$ is a hydrocarbon group having 1 to 12 carbon atoms. Examples of $R^c$ include unsaturated or saturated aliphatic hydrocarbon groups having 1 to 12 carbon atoms. Specific examples include methyl group, ethyl group, n-propyl group, iso-propyl group, n-butyl group, iso-butyl group, sec-butyl group, n-pentyl group, iso-pentyl group, cyclopentyl group, n-hexyl group, cyclohexyl group and octyl group, with ethyl group being particularly preferable.

Specific examples of the compounds represented by the above formula include dimethylaminotriethoxysilane, diethylaminotriethoxysilane, diethylaminotrimethoxysilane, diethylaminotriethoxysilane, diethylamino-tri-n-propoxysilane, di-n-propylaminotriethoxysilane, methyl-n-propylaminotriethoxysilane, t-butylaminotriethoxysilane, ethyl-n-propylaminotriethoxysilane, ethyl-iso-propylaminotriethoxysilane and methylethylaminotriethoxysilane.

Examples of the organosilicon compounds further include compounds represented by the following formula.

$RNSi(OR^a)_3$

In the formula, RN is a cyclic amino group. Examples of the cyclic amino groups include perhydroquinolino group, perhydroisoquinolino group, 1,2,3,4-tetrahydroquinolino group, 1,2,3,4-tetrahydroisoquinolino group and octamethyleneimino group.

Specific examples of the silane compounds represented by the above formula include (perhydroquinolino)triethoxysilane, (perhydroisoquinolino)triethoxysilane, (1,2,3,4-tetrahydroquinolino)triethoxysilane, (1,2,3,4-tetrahydroisoquinolino)triethoxysilane and octamethyleneiminotriethoxysilane.

Two or more of the organosilicon compounds may be used in combination.

The polypropylene resin (A) used in the invention may be produced by polymerizing or copolymerizing the olefin raw materials in the presence of the olefin polymerization catalyst described above.

Specifically, the propylene polymer (a-1) may be prepared by homopolymerizing propylene or copolymerizing propylene and at least one α-olefin selected from ethylene and α-olefins having 4 to 8 carbon atoms in such a ratio that the content of propylene-derived structural units will be not less than 98 mol %, in the presence of the aforementioned olefin polymerization catalyst.

Further, the propylene.ethylene copolymer (a-2) may be prepared by copolymerizing propylene and ethylene in a single stage or multiple stages in the presence of the aforementioned olefin polymerization catalyst. Specifically, for example, propylene may be polymerized first and thereafter propylene and ethylene may be copolymerized. Alternatively, prepolymerization (preliminary polymerization) may be performed to produce a prepolymerized catalyst (a preliminarily polymerized catalyst), and the polymerization of propylene and subsequently the copolymerization of propylene and ethylene may be performed in the presence of such a prepolymerized catalyst.

The prepolymerization may be usually performed by preliminarily polymerizing an olefin in an amount of 0.1 to 1000 g, preferably 0.3 to 500 g, and particularly preferably 1 to 200 g per 1 g of the olefin polymerization catalyst.

In the prepolymerization, the catalyst may be used in a higher concentration than the catalyst concentration in the main polymerization system.

In the prepolymerization, it is desirable that the concentration of the solid titanium catalyst component (I) be usually about 0.001 to 200 mmol, preferably about 0.01 to 50 mmol, and particularly preferably 0.1 to 20 mmol in terms of titanium atoms per 1 L of the liquid medium.

In the prepolymerization, the amount of the organometallic compound catalyst component (II) may be appropriately such that a polymer will be formed usually in an amount of 0.1 to 1000 g, and preferably 0.3 to 500 g per 1 g of the solid titanium catalyst component (I). Specifically, it is desirable that the amount of the catalyst component be usually about 0.1 to 300 mol, preferably about 0.5 to 100 mol, and particularly preferably 1 to 50 mol per 1 mol of the titanium atoms in the solid titanium catalyst component (I).

The prepolymerization may involve other components such as the aforementioned electron donor components as required. Such components are usually used in amounts of 0.1 to 50 mol, preferably 0.5 to 30 mol, and more preferably 1 to 10 mol per 1 mol of the titanium atoms in the solid titanium catalyst component (I).

The prepolymerization may be performed under mild conditions by adding the olefin and the catalyst components to an inert hydrocarbon medium.

Specific examples of the inert hydrocarbon media used in this case include aliphatic hydrocarbons such as propane, butane, pentane, hexane, heptane, octane, decane, dodecane and kerosene; alicyclic hydrocarbons such as cyclopentane, methylcyclopentane, cyclohexane, cycloheptane, methylcycloheptane and cyclooctane; aromatic hydrocarbons such as benzene, toluene and xylene; halogenated hydrocarbons such as ethylene chloride and chlorobenzene; and mixtures of these hydrocarbons.

Of these inert hydrocarbon media, aliphatic hydrocarbons are particularly preferably used.

When the inert hydrocarbon medium is used, the prepolymerization is preferably performed by a batch process.

On the other hand, the prepolymerization may be performed using the olefin itself as the solvent, or may be performed substantially in the absence of solvents.

In this case, the prepolymerization is preferably carried out continuously.

The olefins used in the prepolymerization may be the same or different from the olefins used in the main polymerization described later. However, it is preferable that propylene be used.

The temperature in the prepolymerization is usually in the range of −20 to +100° C., preferably −20 to +80° C., and more preferably 0 to +40° C.

Next, the main polymerization will be described. The main polymerization is performed after or without the prepolymerization.

The main polymerization may be divided into a step of producing a propylene polymer component and a step of producing a propylene-ethylene copolymer rubber component.

The prepolymerization and the main polymerization may be performed by any of liquid-phase polymerization methods such as bulk polymerization, solution polymerization and suspension polymerization, and gas-phase polymerization methods.

The propylene polymer component is preferably produced by a liquid-phase polymerization method such as bulk polymerization or suspension polymerization, or by a gas-phase polymerization method.

The propylene-ethylene copolymer rubber component is preferably produced by a liquid-phase polymerization method such as bulk polymerization or suspension polymerization, or by a gas-phase polymerization method, and is more preferably produced by a gas-phase polymerization method.

In the case where the reaction form of the main polymerization is slurry polymerization, the reaction solvent may be any of the aforementioned inert hydrocarbons used in the prepolymerization or may be an olefin that is liquid at the reaction temperature and pressure.

In the main polymerization, the solid titanium catalyst component (I) is usually used in an amount of about 0.0001 to 0.5 mmol, and preferably about 0.005 to 0.1 mmol in terms of titanium atoms per 1 L of the polymerization volume.

The organometallic compound catalyst component (II) is usually used in an amount of about 1 to 2000 mol, and preferably about 5 to 500 mol per 1 mol of the titanium atoms in the prepolymerized catalyst component in the polymerization system.

When the electron donor component is used, its amount is 0.001 to 50 mol, preferably 0.01 to 30 mol, and particularly preferably 0.05 to 20 mol per 1 mol of the organometallic compound catalyst component (II).

The molecular weight of the obtained polymer may be controlled (reduced) by performing the main polymerization in the presence of hydrogen, resulting in a polymer with a high melt flow rate.

The amount of hydrogen required to control the molecular weight is variable depending on the type of the production process adopted, the polymerization temperature and the pressure, and thus may be controlled appropriately.

In the step of producing a propylene polymer component, the MFR may be controlled by adjusting the polymerization temperature and the amount of hydrogen.

In the step of producing a propylene-ethylene copolymer rubber component, the intrinsic viscosity may be controlled by adjusting the polymerization temperature, the pressure and the amount of hydrogen.

In the main polymerization, the olefin polymerization temperature is usually about 0 to 200° C., preferably about 30 to 100° C., and more preferably 50 to 90° C.

The pressure (the gauge pressure) is usually set at atmospheric pressure to 100 kgf/cm$^2$ (9.8 MPa), and preferably about 2 to 50 kgf/cm$^2$ (0.20 to 4.9 MPa).

When a propylene.ethylene block copolymer is produced as the propylene.ethylene copolymer (a-2), the polymerization may be performed in any style of batch wise mode, semi-continuous mode or continuous mode. Further, the shape of the reactor may be any of tubular shapes and tank shapes. Furthermore, the polymerization may be performed in two or more stages under different reaction conditions. In this case, a tubular reactor and a tank reactor may be used in combination.

In the production of the propylene.ethylene copolymer, the ethylene/(ethylene+propylene) gas ratio is controlled.

The ethylene/(ethylene+propylene) gas ratio is controlled to 5 to 80 mol %, preferably 10 to 70 mol %, and more preferably 15 to 60 mol %.

There will be described in further detail a method for producing propylene.ethylene block copolymers that are a preferred form of the polypropylene resins (A) used in the invention.

As mentioned hereinabove, based on the knowledge of the present inventors, a fraction ($D_{insol}$) of a propylene.ethylene block copolymer that is insoluble in n-decane at room temperature is mainly composed of a propylene polymer component. That is, the propylene polymer (a-1) corresponds to such a fraction.

On the other hand, a fraction ($D_{sol}$) that is soluble in n-decane at room temperature is mainly composed of a propylene-ethylene copolymer rubber component. That is, the propylene.ethylene copolymer (a-2) corresponds to such a fraction.

Accordingly, a propylene.ethylene block copolymer satisfying the aforementioned requirements may be obtained by performing the following two polymerization steps (polymerization step 1 and polymerization step 2) continuously. (Hereinafter, this process will be written as "direct polymerization process".)

[Polymerization Step 1]

Propylene is polymerized in the presence of a solid titanium catalyst component to produce a propylene polymer component (propylene polymer production step).

[Polymerization Step 2]

Propylene and ethylene are copolymerized in the presence of a solid titanium catalyst component to produce a propylene-ethylene copolymer rubber component (copolymer rubber production step).

The propylene.ethylene block copolymer used in the invention is preferably produced by the production process described above, and more preferably produced by performing the polymerization step 1 in the former stage and the polymerization step 2 in the latter stage.

Each of the polymerization steps (the polymerization step 1 and the polymerization step 2) may be performed using two or more polymerization tanks.

The content of the decane-soluble fraction in the block copolymer may be controlled by adjusting the polymerization time (the residence time) in the step 1 and the step 2.

The polymerization step 1 may be performed in two or more stages using polymerization vessels connected in series. In this case, the ratio of propylene to hydrogen in the polymerization stage may be different among the polymerization vessels. Further, a propylene homopolymer obtained separately by the polymerization step 1 alone may be mixed with a propylene.ethylene block copolymer produced by the above process.

Ethylene.α-Olefin Copolymers (B)

The ethylene.α-olefin copolymer (B) that forms the polypropylene resin composition of the invention is a copolymer of ethylene and an α-olefin having 3 to 8 carbon atoms.

Preferred examples of the α-olefins include propylene, 1-butene, 1-hexene and 1-octene. The α-olefins may be used singly, or two or more may be used as a mixture.

In the invention, the ethylene.α-olefin copolymer (B) is preferably an ethylene-octene copolymer or an ethylene-butene copolymer.

In the ethylene.α-olefin copolymer (B) in the invention, the ethylene content is 65 mol % to 90 mol %. The upper limit of the ethylene content is preferably 85 mol %, and more preferably 80 mol %.

Inorganic Fillers (E)

The basic components constituting the polypropylene resin composition of the invention may include an inorganic filler (E).

The inorganic fillers (E) may be any of known inorganic fillers without limitation. Examples include talc, mica, calcium carbonate, barium sulfate, glass fibers, calcium sulfate or gypsum, magnesium carbonate, magnesium oxide, titanium oxide, iron oxide, and powders or fibers of metals such as zinc, copper, iron and aluminum. These fillers may be used singly or as a mixture.

In particular, preferred inorganic fillers include talc, mica, calcium carbonate and glass fibers, with talc being particularly preferable.

Talc having an average particle diameter of 1 to 15 μm, and preferably 1 to 6 μm may be suitably used.

Basic Components

The basic components that constitute the polypropylene resin composition of the invention include the polypropylene resin (A) including the propylene polymer (a-1) and optionally the propylene.ethylene copolymer (a-2), the ethylene.α-olefin copolymer (B) and optionally the inorganic filler (E). The basic components include 30 to 80 parts by weight of (a-1), 0 to 30 parts by weight of (a-2), 20 to 50 parts by weight of (B) and 0 to 40 parts by weight of (E), and preferably include 30 to 75 parts by weight of (a-1), 0 to 25 parts by weight of (a-2), 20 to 40 parts by weight of (B) and 0 to 40 parts by weight of (E), with respect to 100 parts by weight of the total of (a-1), (a-2), (B) and (E).

In the basic components in the invention, the total amount of (a-1) and (a-2) (namely, the amount of the component (A)) is 30 to 80 parts by weight, and preferably 30 to 75 parts by weight with respect to 100 parts by weight of the total of (a-1), (a-2), (B) and (E). More preferably, the basic components include 0.5 to 25 parts by weight of (a-2) and 0.5 to 40 parts by weight of (E).

The polypropylene resin composition of the invention gives shaped articles exhibiting good impact resistance by its containing the ethylene.α-olefin copolymer (B) in an amount of 20 parts by weight or more with respect to 100 parts by weight of the basic components. Further, the inventive composition gives shaped articles having good rigidity by its containing the polypropylene resin (A) in an amount of 30 parts by weight or more.

In the basic components in the invention, the total of (a-2) and (B) is 20 to 50 parts by weight, and preferably 20 to 40 parts by weight with respect to 100 parts by weight of the total of (a-1), (a-2), (B) and (E).

The propylene.ethylene copolymer (a-2) and the ethylene.α-olefin copolymer (B) are components which may form a room temperature n-decane-soluble fraction. With the total amount of (a-2) and (B) being 20 parts by weight or more with respect to 100 parts by weight of the basic components, sufficient Izod impact strength may be obtained easily. With the total amount being 50 parts by weight or less, the composition tends to exhibit sufficient rigidity and is suited for use in applications such as automobile interior and exterior parts. The ratio in parts by weight of the ethylene.α-olefin copolymer (B) to the total of the propylene.ethylene copolymer (a-2) and the ethylene.α-olefin copolymer (B), namely, (B)/((a-2)+(B)) is preferably 0.5 to 1, and more preferably 0.7 to 1. The feature that (B)/((a-2)+(B)) is 0.5 or more indicates that the ethylene.α-olefin copolymer (B) has a relatively large proportion in the amount of the components in the basic components which may form a room temperature n-decane-soluble fraction. In the invention, the ethylene.α-olefin copolymer (B) represents half or more than half of the amount of the possible room temperature n-decane-soluble fraction present in the basic components. It is probably because of this configuration that the fatty acid amide (C) and the surfactant (D) described later are allowed to migrate to the surface of shaped articles easily. The content of the inorganic filler (E) optionally included in the basic components in the invention is not particularly limited and may be controlled appropriately in accordance with the desired properties of shaped articles formed from the resin composition. It is, however, desirable that the content thereof be 40 parts by weight or less with respect to 100 parts by weight of the total of (a-1), (a-2), (B) and (E).

Fatty Acid Amides (C)

The fatty acid amide (C) that constitutes the polypropylene resin composition of the invention is preferably a fatty acid amide capable of serving as a lubricant or an antistatic agent. The fatty acid amides used in the invention may be saturated fatty acid amides or unsaturated fatty acid amides, and are preferably fatty acid amides having 8 to 25 carbon atoms or dimers thereof, more preferably fatty acid amides having 8 to 25 carbon atoms, and still more preferably fatty acid amides having 15 to 25 carbon atoms.

Specific examples of the fatty acid amides (C) include oleamide, stearamide, erucamide, behenamide, palmitamide, myristamide, lauramide, caprylamide, capramide, n-oleylpalmitamide, n-oleylerucamide, and dimers thereof. In particular, oleamide, stearamide, erucamide, behenamide, and erucamide dimer are preferable.

These may be used singly, or two or more may be used as a mixture.

The fatty acid amide (C) is present in the inventive polypropylene resin composition in an amount of 0.2 to 1 part by weight, preferably 0.2 to 0.8 parts by weight, and more preferably 0.2 to 0.6 parts by weight with respect to 100 parts by weight of the basic components.

Surfactants (D)

The surfactant (D) that constitutes the polypropylene resin composition of the invention is preferably one serving as an antistatic agent in the polypropylene resin composition.

The surfactants used in the invention may be any of surfactants which may be added to polypropylene resins. Ester surfactants may be preferably used. More preferred surfactants are compounds having one or two ester groups of 8 to 25 carbon atoms, and preferably 15 to 25 carbon atoms.

Examples of such surfactants (D) include glycerol fatty acid esters, diglycerol fatty acid esters, sorbitan fatty acid esters, sucrose fatty acid esters, alkyl glucosides and polyvalent carboxylate esters. Of these, glycerol fatty acid esters and diglycerol fatty acid esters may be preferably used.

Examples of the glycerol fatty acid esters (namely, fatty acid monoglycerides) include stearic acid monoglyceride, oleic acid monoglyceride, linoleic acid monoglyceride, lauric acid monoglyceride, palmitic acid monoglyceride, myristic acid monoglyceride, behenic acid monoglyceride and margaric acid monoglyceride. Of these, stearic acid monoglyceride and oleic acid monoglyceride may be preferably used.

Examples of the diglycerol fatty acid esters (namely, fatty acid diglycerides) include stearic acid diglyceride, oleic acid diglyceride, linoleic acid diglyceride, lauric acid diglyceride, palmitic acid diglyceride, myristic acid diglyceride, behenic acid diglyceride and margaric acid diglyceride. Of these, stearic acid diglyceride and oleic acid diglyceride may be preferably used.

Of the above ester compounds, those surfactants in which the fatty acid ester groups have 8 to 25 carbon atoms may be suitably used in the invention.

The surfactant (D) is present in the inventive polypropylene resin composition in an amount of 0.2 to 1 part by weight, preferably 0.2 to 0.8 parts by weight, and more preferably 0.2 to 0.6 parts by weight with respect to 100 parts by weight of the basic components.

The polypropylene resin composition of the invention contains the fatty acid amide (C) and the surfactant (D) each in an amount of 0.2 to 1 part by weight with respect to 100 parts by weight of the basic components. With this configuration, the component (C) and the component (D) interact so as to make it possible for shaped articles of the resin composition to exhibit an excellent resistance to friction with soft substances such as rubbers without causing problems such as mold contamination which is possibly encountered when the component (C) and the component (D) are used in excessively large amounts.

Additives (F)

The polypropylene resin composition of the invention may contain additives (F) such as heat stabilizers, weather stabilizers, light stabilizers, anti-aging agents, antioxidants, fatty acid metal salts, softeners, dispersants, fillers, colorants and pigments as required without impairing the object of the invention.

Components such as additives may be mixed in any order. That is, such components may be mixed simultaneously, or a multistage mixing method may be adopted in which some of the components are mixed together and other components are mixed with the mixture.

Polypropylene Resin Compositions

The polypropylene resin composition of the invention includes the basic components which include the polypropylene resin (A) containing the propylene polymer (a-1) and optionally the propylene.ethylene copolymer (a-2), the ethylene.α-olefin copolymer (B) and optionally the inorganic filler (E), and further includes the fatty acid amide (C) and the surfactant (D). The contents of these components are as described below.

The basic components include 30 to 80 parts by weight of the propylene polymer (a-1), 0 to 30 parts by weight of the propylene.ethylene copolymer (a-2), 20 to 50 parts by weight of the ethylene.α-olefin copolymer (B) and 0 to 40 parts by weight of the inorganic filler (E). Preferably, the basic components include 30 to 75 parts by weight of (a-1), 0 to 25 parts by weight of (a-2) and 20 to 40 parts by weight of the ethylene.α-olefin copolymer (B). More preferably, the basic components include 30 to 75 parts by weight of (a-1), 0 to 25 parts by weight of (a-2) and 25 to 40 parts by weight of the ethylene.α-olefin copolymer (B). The total of (a-1), (a-2), (B) and (E) is 100 parts by weight, and the total of (a-1) and (a-2), namely, the amount of the polypropylene resin (A) is 30 to 80 parts by weight, and preferably 30 to 75 parts by weight.

The polypropylene resin composition of the invention includes the fatty acid amide (C) in an amount of 0.2 to 1 part by weight, preferably 0.2 to 0.8 parts by weight, and more preferably 0.2 to 0.6 parts by weight, and the surfactant (D) in an amount of 0.2 to 1 part by weight, preferably 0.2 to 0.8 parts by weight, and more preferably 0.2 to 0.6 parts by weight with respect to 100 parts by weight of the basic components.

The polypropylene resin composition of the invention may contain other components without impairing the object of the invention. Examples of such additional components include the aforementioned additives (F). The additional components may be added in amounts that are selected appropriately in accordance with the manifestation of the effects of such components without impairing the object of the invention.

The polypropylene resin composition of the invention including the various components in the aforementioned ratio can give shaped articles that exhibit sufficient impact resistance and rigidity and also show excellent surface lubricating properties. Thus, such shaped articles may be effectively prevented from scuffs or whitening due to friction with soft substances such as rubbers.

The polypropylene resin composition of the invention may be produced by mixing the basic components including the polypropylene resin (A), the ethylene.α-olefin copolymer (B) and optionally the inorganic filler (E), together with the fatty acid amide (C), the surfactant (D) and optionally additional components such as the additives (F).

These components may be mixed in no particular order.

The polypropylene resin composition of the invention may be obtained by mixing or melt kneading the component (A), the component (B) and optionally the component (E), together with the component (C), the component (D) and optionally the component (F) using a mixing apparatus such as a Banbury mixer, a single-screw extruder, a twin-screw extruder or a high-speed twin-screw extruder.

The polypropylene resin composition of the invention may be formed into appropriate shapes by known forming methods, and is particularly suited for injection molding.

<Shaped Articles>

The shaped article of the invention includes the polypropylene resin composition of the invention described hereinabove.

The shaped articles of the invention may be obtained with excellent forming properties. Further, the shaped articles have sufficient rigidity as a result of the inventive polypropylene resin composition containing the polypropylene resin (A) in the aforementioned ratio, and exhibit sufficient impact resistance as a result of the raw material composition containing the ethylene.α-olefin copolymer (B) in the aforementioned ratio. Because of the composition containing the fatty acid amide (C) and the surfactant (D) in the aforementioned ratio, the shaped articles may be obtained without causing problems such as mold contamination during the shaping, and exhibit excellent friction resistance, in particular, exhibit an excellent resistance to friction with soft substances such as rubbers.

Although the reasons are not clear as to why the polypropylene resin compositions of the invention can give shaped articles having such excellent properties, the present inventors assume that the following will be some possible reasons. In shaped articles of resin compositions containing an ethylene.α-olefin copolymer as an elastomer component, it is considered that lubricants and surfactants will migrate to the surface of the shaped articles via an amorphous phase composed of the elastomer component. Thus, a certain amount of the elastomer component will be a minimum essential requirement. Another reason as to why the polypropylene resin composition should contain the ethylene.α-olefin copolymer as an essential component will be as follows. In the case where the polypropylene resin composition contains the propylene.ethylene copolymer rubber alone as a soft component, the propylene.ethylene copolymer rubber shows good compatibility with the polypropylene amorphous phase and consequently the rubber is dissolved into the polypropylene amorphous phase to cause the matrix (the sea phase) to become softened. On the other hand, the ethylene.α-olefin copolymer has a lower compatibility with the semi-crystalline polypropylene matrix than the propylene.ethylene copolymer and thus is not dissolved into the amorphous matrix. That is, the softening of the matrix is avoided. This is probably the reason why the shaped articles are resistant to deformation.

Further, the combined use of the lubricant and the surfactant probably produces the following effects. The lubricant and the surfactant are considered to contribute to enhancing the surface lubricating properties by at least partially exuding to the surface of shaped articles. When either of these components is used alone, it is probable that the exudates gather locally on the surface of shaped articles and consequently often fail to provide sufficient lubricating properties over the entire surface. In contrast, the polypropylene resin composition of the invention contains the fatty acid amide and the surfactant in the specific amounts and thus can give shaped articles in which the fatty acid amide and the surfactant interact to be dispersed in each other. That is, the above mechanism is probably the reason why these components can impart high lubricating properties to the entire surface without forming local gatherings on the surface of shaped articles, in spite of the fact that the amounts of these components added are small.

The polypropylene resin compositions of the invention have excellent forming properties and may be formed into shaped articles by various forming methods. Examples of the shaped articles formed of the polypropylene resin compositions include injection molded articles, expansion molded articles, injection expansion molded articles, extruded articles, blow molded articles, vacuum pressure formed articles, calendered articles, oriented or stretched films and blown films. In particular, the inventive compositions may be suitably used for the production of injection molded articles.

The shaped articles of the invention may be produced by methods such as injection molding under known forming conditions without limitation.

The applications of the shaped articles of the invention are not particularly limited. Some suitable applications include automobile interior and exterior materials such as door panels, pillar trims, door trims, door lower garnishes and instrument panels, engine room peripheral parts, other automobile parts, home appliance parts, food containers, beverage containers, medical containers and other containers. In particular, the shaped articles are suited for use in automobile interior and exterior materials, and are particularly suited for such parts as automobile door parts and pillar parts.

EXAMPLES

Hereinbelow, the present invention will be described in further detail based on Examples. However, the scope of the invention is not limited to such Examples.

In Examples and Comparative Examples, various properties were measured or evaluated by the following methods.

MFR

The melt flow rate (MFR) was measured at 230° C. under 21.16 N load in accordance with JIS K 7210.

Content of Rubber Component (Content of Room Temperature n-Decane-Soluble Fraction [Wt %]):

First, 5 g of a sample was accurately weighed and was added to a 1,000 ml eggplant flask. Further, 1 g of BHT (dibutylhydroxytoluene, a phenolic antioxidant) was added. Thereafter, a rotor and 700 ml of n-decane were added.

Next, a condenser was attached to the eggplant flask. While rotating the rotor, the flask was heated in an oil bath at 135° C. for 120 minutes and thereby the sample was dissolved in n-decane.

The contents in the flask were poured into a 1,000 ml beaker. While stirring the solution in the beaker with the stirrer, the temperature was naturally cooled (for at least 8 hours) to room temperature (25° C.), and the precipitate was filtered through a metal mesh.

The filtrate was further filtered through filter paper, and was poured into 2,000 ml of methanol contained in a 3,000 ml beaker. The liquid was allowed to stand at room temperature (25° C.) for at least 2 hours while performing stirring with the stirrer.

The resultant precipitate was filtered through a metal mesh, and was air dried for at least 5 hours and dried in a vacuum dryer at 100° C. for 240 to 270 minutes, thereby recovering the 25° C. n-decane-soluble fraction.

The content (x) of the 25° C. n-decane-soluble fraction is expressed as x (mass %)=100×C/A wherein A is the sample weight in g and C is the weight in g of the recovered n-decane-soluble fraction.

Ethylene Content (Wt %) in Rubber Component

The ethylene content was measured by Fourier transform infrared spectroscopy (FT-IR).

Intrinsic Viscosity [η] of Rubber Component

The intrinsic viscosity was measured using a decalin solvent at 135° C. Specifically, approximately 20 mg of a sample was dissolved in 15 ml of decalin and the specific viscosity ηsp was measured in an oil bath at 135° C. The decalin solution was diluted by the addition of 5 ml of the decalin solvent, and the specific viscosity ηsp was measured in the similar manner. This dilution operation was repeated two more times, and the concentration (C) was extrapolated to 0. The value of ηsp/C at the zero concentration was obtained as the intrinsic viscosity ([η]: [dl/g]).

$$[\eta] = \lim(\eta sp/C)(C \to 0)$$

Scuff Test by Rubber Friction (Kicking Scuff Test)

A resin composition was injected into a mold to form an injection molded article having a grained surface. After at least 1 week after the molding, the shaped article was conditioned by being allowed to stand at a constant temperature of 23° C. for at least 2 hours prior to the testing, thereby preparing a test piece. The test piece was 120 cm in length, 80 cm in width and 0.3 cm in thickness.

Figure 1:
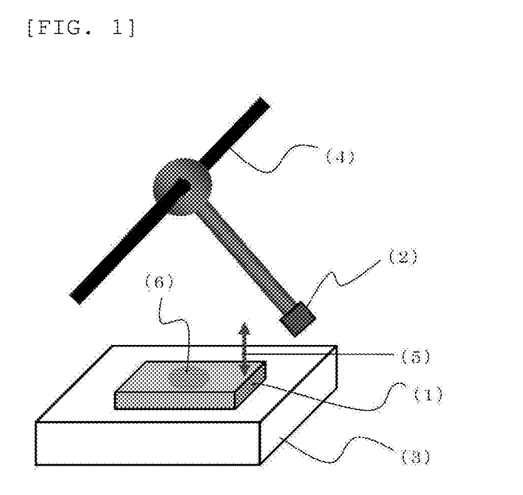
FIG. 1 is a schematic view illustrating a kicking scuff test machine used in Examples.

The test piece was evaluated with a kicking scuff test machine which included a test piece holder and a metallic pendulum configured to be fitted with a frictional tester such as a rubber at an end. The test machine was configured to reproduce the kicking with a shoe sole in such a manner that the pendulum was fallen from a height of 20 cm from the scuffing test surface of the test piece and thereby the rubber tester attached to the end of the pendulum was caused to rub the test surface of the test piece. The test machine is schematically illustrated in FIG. 1.

The rubber tester for producing friction was a rubber piece having a Shore A surface hardness of 75 (product number 18215-SA0-000 manufactured by Honda Motor Co., Ltd.).

The test was conducted by two operators in accordance with the following procedures.

1. The test piece (1) was fixed on a base (3) of the machine.

2. A digital depth gauge was set with respect to an upper portion of the pendulum. The tip of the gauge was brought into contact with the upper portion of the pendulum, thereby confirming that the scale of the gauge indicated 0 mm.

3. A lever of a pantograph (4) was rotated to raise its base until the scale of the gauge indicated 0.3 mm.

4. The end of the pendulum fitted with the frictional tester (the rubber tester) (2) was lifted to a prescribed height ((5), 20 cm from the scuffing test surface).

5. The pendulum was released and the rubber was caused to rub the test surface of the test piece (1).

6. The test surface (6) was visually inspected for scuffs.

The results of the kicking scuff test were evaluated by comparing the surface conditions to the following evaluation criteria. Grade 5 indicates the best evaluation result, while Grade 1 means the worst evaluation result.

1. The surface of the rubbed portion had heavy whitening.

2. The surface of the rubbed portion had marked whitening.

3. The surface of the rubbed portion had slight whitening.

4. The rubbed portion had a trace of rubbing with the rubber but was free from whitening.

5. The surface was free from a trace of rubbing with the rubber or whatsoever.

Production Example 1

Production of Propylene Polymer A-1

(1) Preparation of Solid Titanium Catalyst Component 952 g of anhydrous magnesium chloride, 4420 ml of decane and 3906 g of 2-ethylhexyl alcohol were heated at 130° C. for 2 hours to give a uniform solution. To the solution, 213 g of phthalic anhydride was added. The mixture was stirred at 130° C. for 1 hour, and thereby the phthalic anhydride was dissolved.

The resultant uniform solution was cooled to 23° C. Thereafter, 750 ml of the uniform solution was added dropwise to 2000 ml of titanium tetrachloride held at −20° C. over a period of 1 hour. After the dropwise addition, the temperature of the mixture liquid obtained was increased to 110° C. in 4 hours. When the temperature reached 110° C., 52.2 g of diisobutyl phthalate (DIBP) was added. The mixture was held at the temperature for 2 hours while performing stirring. Next, the solid was collected by hot filtration and was resuspended in 2750 ml of titanium tetrachloride. The suspension was heated again at 110° C. for 2 hours.

After the completion of the heating, the solid was collected by hot filtration and was washed with decane and hexane at 110° C. until no titanium compounds were detected in the washing liquid.

The solid titanium catalyst component prepared as described above was stored as a hexane slurry. A portion of the slurry was dried and was analyzed to examine the catalyst composition. The solid titanium catalyst component was then found to contain 2 wt % titanium, 57 wt % chlorine, 21 wt % magnesium and 20 wt % DIBP.

(2) Production of Prepolymerized Catalyst

A 20 L-volume autoclave equipped with a stirrer was loaded with 87.5 g of the solid titanium catalyst component, 99.8 ml of triethylaluminum, 28.4 ml of diethylaminotriethoxysilane and 12.5 L of heptane. At an inside temperature of 15 to 20° C., 875 g of propylene was fed and reaction was performed for 100 minutes while performing stirring. After the completion of the polymerization, the solid component was settled, the supernatant liquid was removed, and the residue was washed with heptane two times. The resultant prepolymerized catalyst was resuspended in purified heptane. The concentration of the solid catalyst component was adjusted to 0.7 g/L by the addition of heptane.

(3) Main Polymerization

A 1000 L-volume polymerization vessel equipped with a stirrer was continuously charged with propylene at 131 kg/h, the catalyst slurry at 0.70 g/h in terms of the transition metal catalyst component, triethylaluminum at 19.6 ml/h, and diethylaminotriethoxysilane at 4.2 ml/h. Hydrogen was supplied to control the hydrogen concentration in the gas phase to 5.3 mol %. Polymerization was performed at a polymerization temperature of 75° C. and a pressure of 3.5 MPa/G.

The slurry obtained was fed to a 500 L-volume polymerization vessel equipped with a stirrer, and polymerization was further carried out by supplying propylene at 30 kg/h and hydrogen to control the hydrogen concentration in the gas phase to 3.9 mol %. The polymerization temperature was 74.5° C. and the pressure was 3.4 MPa/G.

The slurry obtained was fed to a 500 L-volume polymerization vessel equipped with a stirrer, and polymerization was further carried out by supplying propylene at 20 kg/h and hydrogen to control the hydrogen concentration in the gas phase to 3.4 mol %. The polymerization temperature was 73° C. and the pressure was 3.4 MPa/G.

The slurry obtained was deactivated and was subjected to vaporization followed by gas-solid separation. The propylene homopolymer thus obtained was vacuum dried at 80° C. Properties of the propylene homopolymer (the propylene polymer A-1) are described in Table 1.

Production Example 2 (Production of Propylene Polymer A-2)

With use of the solid titanium catalyst component obtained in (1) Preparation of solid titanium catalyst component in Production Example 1, (2) a prepolymerized catalyst was produced and (3) main polymerization was performed in the following manner.
(2) Production of Prepolymerized Catalyst A 20 L-volume autoclave equipped with a stirrer was loaded with 86.0 g of the solid catalyst component, 39.2 ml of triethylaluminum, 11.0 ml of 2-isobutyl-2-isopropyl-1,3-dimethoxypropane and 4.6 L of heptane. At an inside temperature of 10 to 15° C., 860 g of propylene was fed and reaction was performed for 180 minutes while performing stirring. After the completion of the polymerization, the solid component was settled, the supernatant liquid was removed, and the residue was washed with heptane two times. The resultant prepolymerized catalyst was resuspended in purified heptane. The concentration of the solid catalyst component was adjusted to 1.0 g/L by the addition of heptane.
(3) Main Polymerization A 58 L-volume circulation-type tubular polymerization vessel equipped with a jacket was continuously charged with propylene at 40 kg/h, hydrogen at 204 NL/h, the catalyst slurry produced in (2) at 0.66 g/h in terms of the solid catalyst component, triethylaluminum at 2.5 ml/h, and dicyclopentyldimethoxysilane at 1.4 ml/h. Polymerization was performed in the filled polymerization vessel without any gas phase. The temperature in the tubular polymerization vessel was 69.5° C. and the pressure was 3.5 MPa/G.

The slurry obtained was fed to a 100 L-volume polymerization vessel equipped with a stirrer, and polymerization was further carried out by supplying propylene at 15 kg/h and hydrogen to control the hydrogen concentration in the gas phase to 8.8 mol %. The polymerization temperature was 69.5° C. and the pressure was 3.2 MPa/G.

The slurry obtained was transferred to a 2.4 L-volume liquid transfer tube and was vaporized to perform gas-solid separation. The polypropylene homopolymer powder was fed to a 480 L-volume gas-phase polymerization vessel, and ethylene/propylene block copolymerization was performed by continuously supplying propylene, ethylene and hydrogen such that the gas composition in the gas-phase polymerization vessel would give ethylene/(ethylene+propylene)=0.28 (by mol) and hydrogen/ethylene=0.105 (by mol). The polymerization temperature was 70° C. and the pressure was 0.6 MPa/G.

The propylene block copolymer obtained was vacuum dried at 80° C. Properties of the propylene block copolymer (the propylene polymer A-2) are described in Table 1.

Production Example 3 (Production of Propylene Polymer A-3)

With use of the prepolymerized catalyst (the catalyst slurry) obtained by (1) Preparation of solid titanium catalyst component and (2) Production of prepolymerized catalyst in Production Example 1, (3) main polymerization was performed in the following manner.
(3) Main Polymerization A 58 L-volume circulation-type tubular polymerization vessel equipped with a jacket was continuously charged with propylene at 45 kg/h, hydrogen at 182 NL/h, the catalyst slurry produced in (2) at 0.41 g/h in terms of the solid catalyst component, triethylaluminum at 2.7 ml/h, and diethylaminotriethoxysilane at 1.1 ml/h. Polymerization was performed in the filled polymerization vessel without any gas phase. The temperature in the tubular polymerization reactor was 70° C. and the pressure was 3.4 MPa/G.

The slurry obtained was fed to a 100 L-volume polymerization vessel equipped with a stirrer, and polymerization was further carried out by supplying propylene at 15 kg/h and hydrogen to control the hydrogen concentration in the gas phase to 5.8 mol %. The polymerization temperature was 70° C. and the pressure was 3.3 MPa/G.

The slurry obtained was transferred to a 2.4 L-volume liquid transfer tube and was vaporized to perform gas-solid separation. The polypropylene homopolymer powder was fed to a 480 L-volume gas-phase polymerization vessel, and ethylene/propylene block copolymerization was performed by continuously supplying propylene, ethylene and hydrogen such that the gas composition in the gas-phase polymerization vessel would give ethylene/(ethylene+propylene)=0.19 (by mol) and hydrogen/ethylene=0.13 (by mol). The polymerization temperature was 70° C. and the pressure was 1.2 MPa/G.

The propylene block copolymer obtained was vacuum dried at 80° C. Properties of the propylene block copolymer (the propylene polymer A-3) are described in Table 1.

Table 1 also shows properties of a commercial homopolypropylene (product name: J-3000GV, manufactured by Prime Polymer Co., Ltd.) used as a propylene polymer A-4 in Examples and Comparative Examples.

TABLE 1

| | | Propylene polymer (a-1) | | | Propylene·ethylene copolymer (a-2) | | |
|---|---|---|---|---|---|---|---|
| | | MFR | Content of propylene-derived structural units | Content | Intrinsic viscosity $[\eta]$ | Content of ethylene-derived structural units | | Content |
| | | g/10 min | mol % | wt % | dl/g | wt % | mol % | wt % |
| Propylene polymer A-1 | Homo PP | 200 | 99.9 | >99.5 | — | — | — | <0.5 |
| Propylene polymer A-2 | Block PP | 70 | 99.9 | 89 | 2.6 | 30 | 39.1 | 11 |

TABLE 1-continued

| | | Propylene polymer (a-1) | | | Propylene·ethylene copolymer (a-2) | | |
|---|---|---|---|---|---|---|---|
| | | MFR | Content of propylene-derived structural units | Content | Intrinsic viscosity [η] | Content of ethylene-derived structural units | | Content |
| | | g/10 min | mol % | wt % | dl/g | wt % | mol % | wt % |
| Propylene polymer A-3 | Block PP | 45 | 99.9 | 76 | 2.5 | 30 | 39.1 | 24 |
| Propylene polymer A-4 | Homo PP | 30 | 99.9 | >99.5 | — | — | — | <0.5 |

The term "rubber" used for the propylene polymer A-1 and the propylene polymer A-4 in Table 1 indicates a copolymer component formed between impurity components present in the raw material propylene (for example, olefins such as ethylene) and propylene. The term "rubber" used for the propylene polymer A-2 and the propylene polymer A-3 indicates a copolymer component formed between propylene and ethylene.

The following are components other than the components A (the polypropylene resin components) used in Examples described later.

Ethylene·α-olefin copolymer B-1: ethylene·octene random copolymer containing 38.6 wt % α-olefin (octene) and having a MFR of 2 g/10 min, product name: EG8100 manufactured by Dow Chemicals Ethylene·α-olefin copolymer B-2: ethylene·butene random copolymer containing 27.3 wt % α-olefin (butene) and having a MFR of 2 g/10 min, product name: A1070S manufactured by Mitsui Chemicals, Inc.

Fatty acid amide C-1: erucamide, product name: NEUTRON-S manufactured by NIPPON FINE CHEMICAL CO., LTD.

Fatty acid amide C-2: oleamide, product name: NEUTRON-P manufactured by NIPPON FINE CHEMICAL CO., LTD.

Surfactant D-1: glycerol monostearate, product name: ELEC TS-5 manufactured by Kao Corporation.

Inorganic filler E-1: talc, average particle diameter (laser diffractometry) 5 μm, product name: Hi-Filler 5000PJ manufactured by ASADA MILLING CO., LTD.

Example 1

The propylene polymer A-1 obtained in Production Example 1, the ethylene·α-olefin copolymer B-1, the fatty acid amide C-1 and the surfactant D-1 were used in amounts (parts by weight) described in Table 2, together with additives including 0.1 part by weight of Irganox 1010 (manufactured by BASF) and 0.1 part by weight of Irgafos 168 (manufactured by BASF) as antioxidants, 0.1 part by weight of LA-52 (manufactured by ADEKA CORPORATION) as a light stabilizer, 0.1 part by weight of calcium stearate (manufactured by NOF CORPORATION) as a lubricant, 0.1 part by weight of ADK STAB NA-11 (manufactured by ADEKA CORPORATION) as a nucleating agent, and 3 parts by weight of MB PPCM 888Y-232 (manufactured by TOKYO PRINTING INK MFG. CO., LTD.) as a black pigment. These components were sequentially mixed together in a tumbler to give a dry blend.

The resultant mixture was kneaded in a twin-screw extruder (product name: TEX manufactured by The Japan Steel Works, Ltd.) and pelletized into polypropylene resin composition pellets. The kneading conditions were such that the kneading temperature was 180° C., the screw rotational speed was 750 rpm and the output was 60 kg/h.

The pellets were injection molded into a test piece described above. The test piece was tested (by the kicking scuff test) to evaluate the resistance to scuffs by friction with rubber. The results are described in Table 2.

Examples 2 to 11 and Comparative Examples 1 to 9

Polypropylene resin composition pellets were produced in the same manner as in Example 1, except that the types and the amounts of the components A to E (namely, the types and the amounts in parts by weight of the components except the additives) were changed as described in Table 2 or Table 3. The pellets were injection molded into test pieces, which were tested (by the kicking scuff test) to evaluate the resistance to scuffs by friction with rubber. The results are described in Table 2 or 3.

In Examples 1 to 11 and Comparative Examples 1 to 9, any mold contamination or consequent forming failures did not occur during the injection molding.

Figure 2:
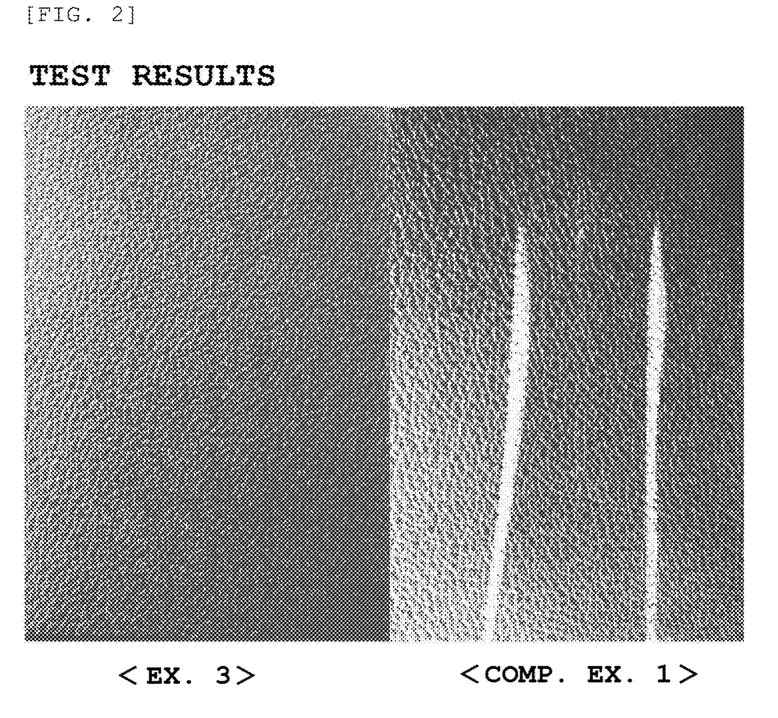
FIG. 2 is a schematic view illustrating the appearances of test pieces subjected to a kicking scuff test in Example 3 and Comparative Example 1.

As representative examples, the surface conditions of the test pieces after the scuff test (the kicking scuff test) in Example 3 and Comparative Example 1 are shown in FIG. 2. The left side of the figure shows the result of the scuff test in Example 3 (rated as Grade 4), and the right side of the figure is the result of the scuff test in Comparative Example 1 (rated as Grade 2).

TABLE 2

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| Amounts (parts by weight) | Propylene resins (A) | A-1 | 75 | | | | | | | | | | |
| | | A-2 | | | | | | | | | | 65 | 65 |
| | | A-3 | | | | | | | | | | | |
| | | A-4 | | 70 | 50 | 50 | 50 | 60 | 60 | 45 | 30 | | |
| | Ethylene·α-olefin copolymers (B) | B-1 | 25 | 30 | 50 | 50 | 50 | 30 | | 30 | 30 | 20 | 20 |
| | | B-2 | | | | | | | 30 | | | | |

TABLE 2-continued

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Fatty acid amides (C) | C-1 | 0.5 | 0.5 | 0.5 | 0.35 | 0.2 | 0.5 | 0.5 | 0.5 | 0.5 | 0.5 |  |
|  | C-2 |  |  |  |  |  |  |  |  |  |  | 0.5 |
| Surfactant (D) | D-1 | 0.3 | 0.3 | 0.3 | 0.25 | 0.2 | 0.3 | 0.3 | 0.3 | 0.3 | 0.3 | 0.3 |
| Inorganic filler (E) | E-1 |  |  |  |  |  | 10 | 10 | 25 | 40 | 15 | 15 |
| (a-2) + (B) | Parts by weight | 25 | 30 | 50 | 50 | 50 | 30 | 30 | 30 | 30 | 27 | 27 |
| (B)/((a-2) + (B)) | — | 1 | 1 | 1 | 1 | 1 | 1 | 1 | 1 | 1 | 0.74 | 0.74 |
| MFR of resin composition | (g/10 min) | 95 | 19 | 12 | 13 | 13 | 19 | 18 | 17 | 11 | 29 | 30 |
| Results of kicking scuff test | Grade | 3 | 3 | 4 | 4 | 4 | 4 | 4 | 4 | 4 | 4 | 4 |

TABLE 3

|  |  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|---|
| Amounts (parts by weight) | Propylene resins (A) | A-1 |  |  |  |  |  |  |  |  |  |
|  |  | A-2 |  |  |  |  |  |  | 65 | 65 |  |
|  |  | A-3 |  |  |  |  |  |  |  |  | 100 |
|  |  | A-4 | 100 | 100 | 95 | 85 | 70 | 90 |  |  |  |
|  | Ethylene·α-olefin copolymers (B) | B-1 |  |  |  |  |  | 10 | 20 | 20 |  |
|  |  | B-2 |  |  |  |  |  |  |  |  |  |
|  | Fatty acid amides (C) | C-1 |  | 0.5 | 0.5 | 0.5 | 0.5 | 0.5 | 0.8 |  | 0.5 |
|  |  | C-2 |  |  |  |  |  |  |  |  |  |
|  | Surfactant (D) | D-1 |  | 0.3 | 0.3 | 0.3 | 0.3 | 0.3 |  | 0.8 | 0.3 |
|  | Inorganic filler (E) | E-1 |  |  | 5 | 15 | 30 |  | 15 | 15 |  |
|  | (a-2) + (B) | Parts by weight | 0 | 0 | 0 | 0 | 0 | 10 | 27 | 27 | 24 |
| (B)/((a-2) + (B)) |  | — | — | — | — | — | — | 1 | 0.74 | 0.74 | 0 |
| MFR of resin composition |  | (g/10 min) | 30 | 38 | 36 | 39 | 37 | 29 | 29 | 29 | 51 |
| Results of kicking scuff test |  | Grade | 2 | 2 | 2 | 2 | 2 | 2 | 2 | 2 | 2 |

As shown in Table 2 and Table 3, the shaped articles were rated as Grade 3 or above in the kicking scuff test when the polypropylene resin compositions contained the fatty acid amide (C) and the surfactant (D) in the specific amounts relative to the basic components including the polypropylene resin (A) and the ethylene.α-olefin copolymer (B), in spite of the fact that the amounts of the fatty acid amide and the surfactant were small. That is, it was demonstrated that the inventive configuration sufficiently suppressed surface deterioration due to friction with rubbers or the like.

INDUSTRIAL APPLICABILITY

The polypropylene resin compositions of the invention may be used for the production of various shaped articles such as injection molded articles without limitation, and in particular may be suitably used in automobile interior and exterior parts such as pillar trims, door panels, door trims, door lower garnishes and instrument panels.

REFERENCE SIGNS LIST (1) TEST PIECE
(2) FRICTIONAL TESTER (RUBBER TESTER)
(3) BASE
(4) PANTOGRAPH
(5) HEIGHT OF PENDULUM (20 cm)
(6) TEST SURFACE

The invention claimed is:

1. A polypropylene resin composition consisting of:
100 parts by weight of basic components, wherein the basic components comprise (A), (B), and (E), including:

(A) a polypropylene resin including:
(a-1) 30 to 80 parts by weight of a propylene polymer having a melt flow rate measured in accordance with JIS K 7210 (MFR, 230° C., 21.16 N load) of 10 g/10 min to 300 g/10 min, and containing 98 mol % to 100 mol % of structural units derived from propylene and 0 mol % to 2 mol % of structural units derived from at least one α-olefin selected from ethylene and α-olefins having 4 to 8 carbon atoms, and
(a-2) 0.5 to 30 parts by weight of a propylene ethylene copolymer having an intrinsic viscosity [η] measured at 135° C. in decalin of 1.5 dl/g to 8 dl/g and containing 30 mol % to 60 mol % of structural units derived from ethylene,
the total of (a-1) and (a-2) being 30 to 80 parts by weight,
(B) 20 to 50 parts by weight of an ethylene.α-olefin copolymer having an ethylene content of 65 mol % to 90 mol % and including ethylene and at least one α-olefin selected from α-olefins having 3 to 8 carbon atoms, and
(E) 0 to 40 parts by weight of an inorganic filler,
the total of (a-2) and (B) being 20 to 50 parts by weight (the total of (A), (B) and (E) is 100 parts by weight);
0.2 to 1 part by weight of a fatty acid amide (C);
0.2 to 1 part by weight of a surfactant (D),
optionally one or more additives (F) selected from the group consisting of heat stabilizers, weather stabilizers, light stabilizers, anti-aging agents, antioxidants, fatty acid metal salts, softeners, dispersants, fillers, colorants and pigments; and,
optionally one or more components of olefin polymerization catalyst,
wherein the fatty acid amide (C) is selected from the group consisting of oleamide, stearamide, erucamide, behenamide, and erucamide dimer, wherein the surfactant (D) is a compound selected from the group consisting of glycerol fatty acid esters, diglycerol fatty acid esters, sorbitan fatty acid esters, sucrose fatty acid esters, alkyl glucosides, polyvalent carboxylate esters, and wherein the total of (A), (B), and (E) is 100 parts per weight.

2. The polypropylene resin composition according to claim 1, wherein the surfactant (D) has one or two ester groups of 8 to 25 carbon atoms.

3. A shaped article comprising the polypropylene resin composition described in claim 1.

4. The shaped article according to claim 3, wherein the shaped article is an injection molded article.

5. The shaped article according to claim 3, wherein the shaped article is an automobile interior or exterior part.

6. The shaped article according to claim 5, wherein the automobile interior or exterior part is an automobile door part or pillar part.

* * * * *